(No Model.)

A. A. WILDER.
HAND DRILL.

No. 269,250. Patented Dec. 19, 1882.

WITNESSES
Samuel C. Thomas
J. Edward Warren

INVENTOR
Aretus A. Wilder
By W. W. Leggett,
Attorney

UNITED STATES PATENT OFFICE.

ARETUS A. WILDER, OF DETROIT, MICHIGAN, ASSIGNOR OF ONE-HALF TO CORYDON B. PALMER, OF SAME PLACE.

HAND-DRILL.

SPECIFICATION forming part of Letters Patent No. 269,250, dated December 19, 1882.

Application filed April 25, 1882. (No model.)

*To all whom it may concern:*

Be it known that I, ARETUS A. WILDER, of Detroit, county of Wayne, State of Michigan, have invented a new and useful Improvement in Hand-Drills; and I declare the following to be a full, clear, and exact description of the invention, such as will enable others skilled in the art to which it pertains to make and use it, reference being had to the accompanying drawings, which form a part of this specification.

My invention consists in the combination of devices and appliances hereinafter specified, and more particularly pointed out in the claims.

Figure 1:
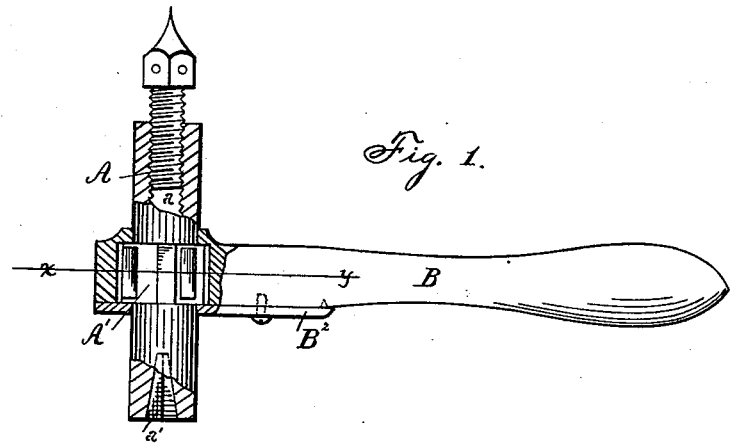
Figure 2:
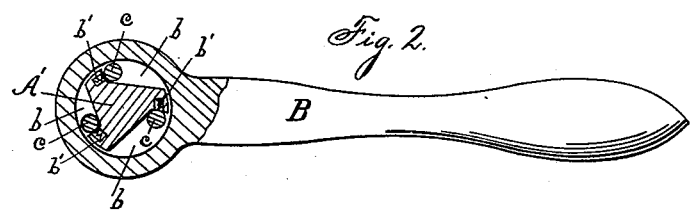
Figure 3:
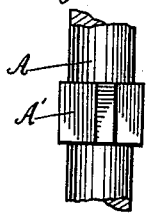
Figure 4:
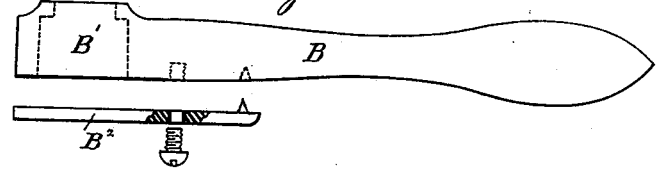
Figure 5:

In the drawings, Figure 1 is a view partly in elevation and partly in section of a device embodying my invention. Fig. 2 is a sectional view along the line $x y$ of Fig. 1. Fig. 3 is a separate view of the shaft. Fig. 4 is a separate view of the handle and retaining-plate. Fig. 5 is a separate view of the rollers.

The object of my invention is to provide a noiseless hand-drill adapted to perform the same work as the ordinary ratchet hand-drill, and do away with all lost motion between the parts.

While the description is confined to a hand-drill, I do not limit myself narrowly in that respect, for it is equally applicable to any similar device—as, for instance, an auger or any other similar tool.

A is a shaft. It is of the usual form, provided with a feed-screw, $a$, at its end, and a socket, $a'$, for the bit-shank at the other end. This shaft is enlarged and angular in cross-section for a portion of its length, as shown at A', and a handle, B, is provided with a cylindrical sleeve, B', which is adapted to slip over the upper end of the shaft and inclose the angular portion A', so as to leave cam-shaped spaces $b$ between the shaft and the wall of the recess B'. One end of the sleeve B' has an inwardly-projecting flange, $d$, the edge of which forms the wall of a circular passage, through which passes the cylindrical part of the tool-shaft. In the spaces $b$, between the inner periphery of the sleeve and the sides of the angular portion of the tool-shaft, are located small steel rollers $c$, which are prevented from escaping endwise by the flange $d$ and a plate, B², which fits against the opposite end of the sleeve and has a circular passage for the cylindrical part of the shaft, said plate being secured to the handle B. The springs $b'$ hold the rollers $c$ in contact with both the shaft and the inner periphery of the sleeve. It is now apparent that by a movement in one direction the handle is permitted to move freely, but the slightest movement in the opposite direction causes the rollers to bind and moves the drill-shaft with the handle.

I am aware that in a hand-drill the tool-shaft has had formed in the periphery of an enlarged portion thereof cam-shaped recesses in which are placed rollers, the portion of the shaft in which said recesses are formed being inclosed by a two-part sleeve formed at the ends of two arms of a double handle, and the rollers prevented from escaping by inwardly-projecting flanges at the ends of the sleeve, the two parts of which are prevented from lateral displacement by nuts screwed upon the drill-shaft upon opposite sides of said sleeve. The rollers are jammed between the inner periphery of the sleeve and the inclined inner walls of the recesses when the handle is moved in one direction and released when it is moved in the opposite direction. In this form of drill the nuts which hold the sleeve parts in place are liable to work loose, and the construction of the shaft with threads to receive said nuts is expensive. I do not claim such a drill. In my drill the flange $d$ of the sleeve fits against one end of the enlarged angular portion of the shaft, and the plate B² fits against the other end, so that the sleeve is in proper position and is not liable to become loose for endwise play.

What I claim is—

1. The combination, with the tool-shaft having the enlarged angular portion, of the handle having the sleeve inclosing said enlarged angular portion and provided with the flange $d$, fitting against one end of said angular portion, the plate B², having a passage for the cylindrical part of the shaft and fitting against the other end of said angular portion, and the rollers arranged in the spaces between the inner periphery of the sleeve and the sides of the said angular portion of the shaft, substantially as described.

2. The combination, with a tool-shaft angular in cross-section for a portion of its length, a handle provided with a cylindrical sleeve inclosing the angular portion of said shaft, and rollers arranged in the recesses between the sleeve and shaft, of springs arranged to hold said rollers in contact with the sleeve and shaft, substantially as and for the purpose set forth.

In testimony whereof I sign this specification in the presence of two witnesses.

ARETUS A. WILDER.

Witnesses:
J. EDWARD WARREN,
SAMUEL E. THOMAS.